United States Patent Office
3,549,374
Patented Dec. 22, 1970

1

3,549,374
PHOTOGRAPHIC COLOR ELEMENTS CONTAINING POLYMERIC UV ABSORBERS
Hiroyuki Amano, Nobuo Tsuji, and Kazuo Shirasu, Kanagawa, Japan, assignors to Fuji Shashin Film Kaisha, Kanagawa, Japan
No Drawing. Filed Jan. 17, 1967, Ser. No. 609,749
Int. Cl. G03c 1/84, 1/86
U.S. Cl. 96—84                 7 Claims

ABSTRACT OF THE DISCLOSURE

Photographic light sensitive color element containing a compound of the following group to reduce the undesired side effects of ultraviolet radiation:

Polyurea:

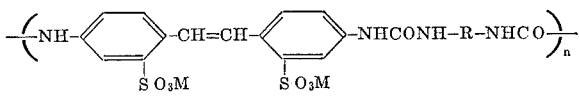

Polyamide:

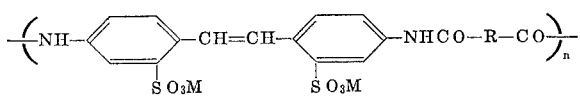

Polyurethane:

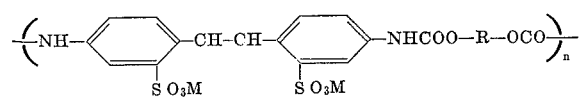

Polyurethane:

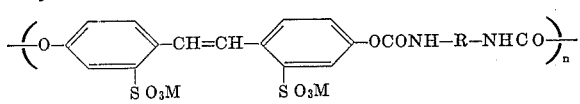

wherein M represents an alkali metal; R represents an aromatic or an aliphatic bivalent residual group, such as

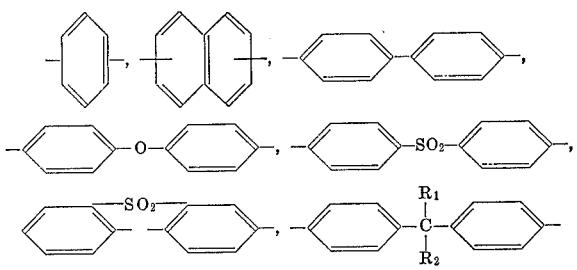

in which $R_1$ and $R_2$ are hydrogen atoms or alkyl radicals containing up to 5 carbon atoms, and $(CH_2)p$, or $(CH_2CH_2—O)q\ CH_2CH_2—$, in which $p$ is an integer from 1 to 10 and $q$ is an integer from 1 to 3; and $n$ shows the polymerization degree.

The agent may be incorporated in any layer of the element, e.g., a photographic silver halide emulsion layer, an intermediate layer or a protective layer.

2

BACKGROUND OF INVENTION

The present invention relates generally to color photography and more particularly to a photographic color element capable of protecting the color image obtained by color development from the action of ultraviolet radiations.

Where a photographic image is exposed to ultraviolet rays, the image will be faded or discolored in response to the intensity and the wave length of the ultraviolet rays. Further, other materials present in a photographic element together with the materials forming the photographic image are sometimes colored by ultraviolet rays. Such action is mainly caused by the ultraviolet rays of 300–400 Nm. in wave length. In order to prevent such an action, ultraviolet absorbers are frequently incorporated in a photographic emulsion layer, an intermediate layer or a protective layer.

However, there are such drawbacks in the conventionally known ultraviolet absorbers that when they are incorporated in a photographic emulsion layer, an intermediate layer or a protective layer, almost the greater part of the ultraviolet absorbers are frequently dissolved out during photographic processing and water washing. Hence, the effect of them is weakened.

Therefore, the inventors have investigated variously to improve the above-mentioned drawback of conventional ultraviolet absorbers and as the result thereof, have found that a remarkable ultraviolet preventing effect can be obtained by incorporating in at least one of the photographic emulsion layers, intermediate layers, or protective layers of a photographic color element, a polyamide, polyurea or polyurethane each containing the recurring unit of the following structure:

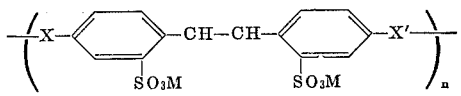

where M is an alkali-1-metal, X and X' are radicals providing the desired polyamide, polyurea or polyurethane, and $n$ indicates the degree of polymerization.

The ultraviolet absorbing high-molecular materials to be used in this invention will be explained in detail.

When a 4,4'-diamino-stilbene-2,2'-disulfonate having the structural formula

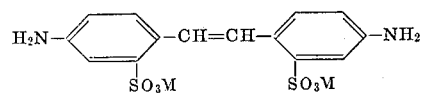

is caused to react with diisocyanate, dicarboxylic acid or its derivative, or dichloro-carbonic acid ester, the corresponding polyurea, polyamide or polyurethane having the aforementioned stilbene structure is obtained, which is suitable for the purpose of the present invention. As the diisocyanate used for the production of the ultraviolet absorber of this invention there may be employed 2,4-toluylene diisocyanate, 2,5-naphthalene diisocyanate, methylene-bis-(4-phenyl isocyanate) - m - xylylenediisocyanate or a polyalkylene diisocyanate represented by O=C=N—(CH$_2$)$_n$—N=C=O($n$=2–10). As the dicarboxylic acid there may be used an aromatic dicarboxylic acid (e.g. terephthalic acid, isophthalic acid, or phthalic acid) or an aliphatic dicarboxylic acid

[e.g., HOOC—(CH$_2$)$_n$—COOH($n$=0–10)]

Further, as the dichloro-carbonic acid ester there may be employed a dichloro carbonic acid ester of an aliphatic diol, such as, ClCOO—(CH$_2$)$_n$—OCOCl($n$=2—10)

ClCOO(CH$_2$CH$_2$O$_n$)—COCl($n$=2–4) or a dichlorocarbonic acid ester of an aromatic diol represented by ClCOO—Ar—OCOCl (wherein Ar represents an aromatic residual group). For example, there may be illustrated the following compounds:

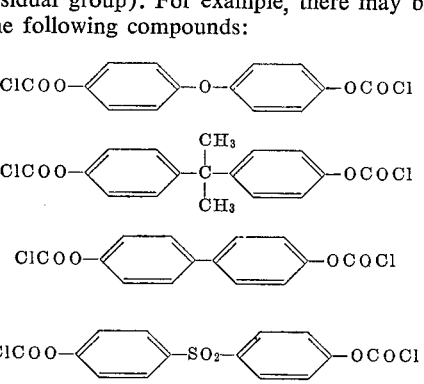

and

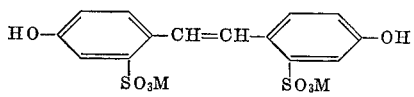

Further, the above-mentioned polyurethane having the stilbene structure which can be adopted in this invention may be prepared by the reaction of a di-isocyanate and a metal salt of 4,4'-dioxystilbene-2,2'-disulfonic acid having the formula

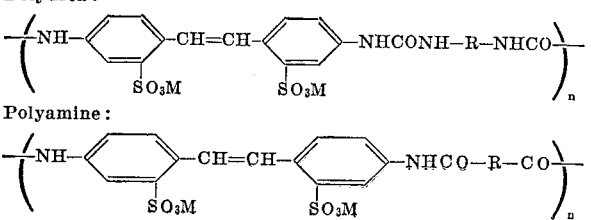

In this case, the di-isocyanate used may be the same as above.

Thus, the high molecular ultraviolet absorbers of the present invention may be represented by the following general structural formulas:

Polyurea:

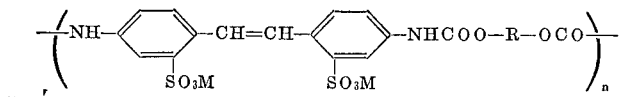

Polyamine:

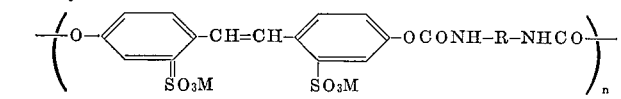

Polyurethane:

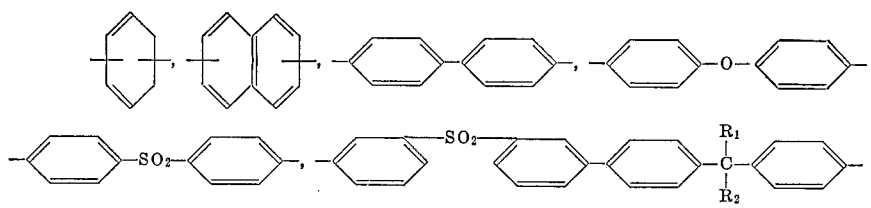

wherein M represents an alkali metal; R represents an aromatic or an aliphatic bivalent residual group, such as, in which R$_1$ and R$_2$ are hydrogen atoms or alkyl radicals containing up to 5 carbon atoms, and (CH$_2$)$_p$, or (CH$_2$CH$_2$—O—)$_q$CH$_2$CH$_2$—, in which $p$ is an integer from 1 to 10 and $q$ is an integer from 1 to 3; and $n$ shows the polymerization degree.

These polymeric compounds may be easily prepared by conventional methods. For example, the above-mentioned polyurea type compounds may be prepared as follows: that is, sodium 4,4'-diamino-stilbene-2,2'-disulfonate is dissolved in formamide, and when a dimethyl formamide solution of diisocyanate in an aquimol amount as that of the diamine is added slowly to the solution while cooling the solution with vigorous stirring, the viscosity of the solution is gradually increased (at a temperature lower than 30° C.). The product is then precipitated with a large quantity of acetone to provide light yellow-brown polyurea. The polyamide type compounds may be easily obtained by using an ordinary interfacial condensation method.

The above mentioned high molecular ultraviolet absorber of this invention may be used as follows: that is, the high molecular ultraviolet absorber is dissolved in water to provide an aqueous solution of 0.1–5% by weight of the material, and to the aqueous solution there is added slowly an aqueous gelatin solution. The proportion of the high molecular ultraviolet absorber is preferably 10–500 g. per 1 kg. of gelatin. The thus prepared mixture of gelatin and the high molecular ultraviolet absorber is applied to a photographic element as an ultraviolet preventing layer in the form of a protective layer or an intermediate layer. Further, the high molecular ultraviolet absorber of the instant invention may be directly incorporated in a photographic silver halide emulsion layer and in this case, the above defined addition amount is also preferable.

With regard to the influence of the molecular weight of the high molecular ultraviolet absorber in this invention, a better ultraviolet preventing effect can be obtained when the intrinsic viscosity of the high molecular ultraviolet absorber of this invention in formamide at 30° C. is about 0.05–2.0.

In addition, the above-mentioned photographic emulsion is the usual gelatino silver halide emulsion, but the present invention may also be effectively applied in the case where protective colloid other than gelatin is employed, such as polyvinyl alcohol and polyvinyl acetal.

Now, the following typical examples illustrate the results of fading prevention and the diffusion resistance for photographic color images obtained by using the high molecular ultraviolet absorbers of the present invention, but it should be understood that the invention shall not be limited to these examples.

EXAMPLE 1

Compound 1

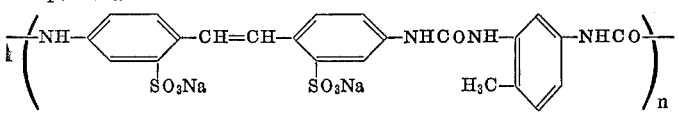

Compound 2

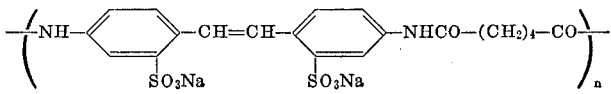

Compound 3

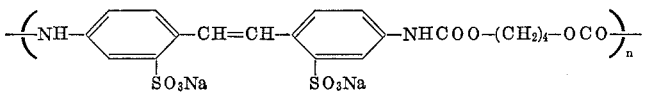

Compound 4

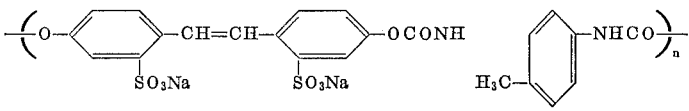

and

Compound 5

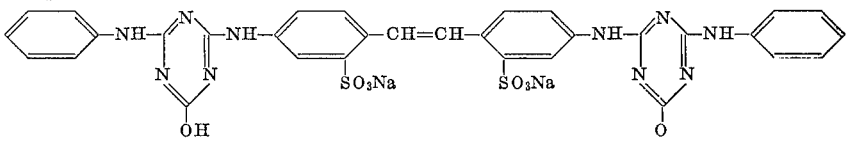

In compounds 1–4, $n$ indicates the degree of polymerization.

Into 100 g. of a 4% aqueous solution of each of Compounds 1–4 of this invention and Compound 5 of a conventional ultraviolet absorber there was added gradually 1 kg. of a 4% aqueous solution of gelatin and the resulting emulsion was applied to the surface of a film support and dried to provide a filter layer of 2.0 microns in thickness. Regarding the prepared film having the filter layer containing each compound, the state of each compound after subjecting the film to water washing (A), washing with an aqueous solution of 3% sodium carbonate (B), or complete photographic processings (C) was observed, the results of which are shown in the following table.

| | Reduction in transmission density (370 n.m.), percent | | | | |
|---|---|---|---|---|---|
| Time | Compound 1 | Compound 2 | Compound 3 | Compound 4 | Compound 5 |
| (A) 30 min | 5 | 7 | 5 | 7 | 85 |
| (A) 2 hrs | 7 | 10 | 7 | 10 | 95 |
| (B) 30 min | 6 | 8 | 6 | 6 | 90 |
| (C) 47 min | 6 | 7 | 6 | 8 | 90 |

It will be understood from the above results that while a low molecular conventional ultraviolet absorber having diffusing properties, such as, Compound 5 is almost completely dissolved off from the gelatin layer during the washing step and complete photographic processing steps, the high molecular Compounds 1–4 of the present invention are scarcely dissolved off and have good diffusion resistance. The complete photographic processing in the above experiments means the steps commonly employed in color paper processing, namely, the steps of color development, water-washing, fixing, water-washing, bleach-fixing, water-washing, hardening, water-washing and drying.

Moreover, other high molecular compounds represented by the above-mentioned structural formulas (1–4) having different high molecular weights showed almost the same effects as the above-mentioned compounds as ultraviolet absorbers when their intrinsic viscosity in formamide at 30° C. was in the range of 0.05–2.0.

EXAMPLE 2

To a baryta paper was applied a blue-sensitive silver iodobromide emulsion containing a yellow coupler, 3,5-dicarboxy-α-(4-stearoylamido-benzoyl) acetanilide. The coupler was added as an alkaline aqueous solution. Thereafter, a green-sensitive silver chloro-bromide emulsion containing a magenta coupler, 1-(3-sulfo-4-phenoxyphenyl)-3-steraroyl-5-pyrazolone, and a red-sensitive silver chloro-bromide emulsion containing a cyan coupler, N-n-octadecyl-1-hydroxy-4-sulfo-2-naphthamide were applied to the thus formed blue-sensitive emulsion layer in order. Then, a protective layer of 2.0 microns in thickness was further applied thereto. The protective layer was formed by applying 1 kg. of an aqueous gelatin solution containing 100 g. of a 4% aqueous solution of one of the high molecular ultraviolet absorbers of this invention having the structure of Compounds 1–4 shown in Example 1.

After exposure, the thus prepared color printing paper was subjected to developing in a developer containing N-ethyl-N-β-hydroxyethyl-p-phenylene diamine, stop-fixing, water-washing, bleach-fixing, water-washing, hardening, water-washing and drying. Thereafter, thus processed printing paper was exposed for 20 hours by means of an xenon tester and then the reduction in color density was measured. The results are shown below.

The xenon tester which was used in the fading experiment had a light source having a spectral distribution and intensity very similar to those of sun light.

FADING PERCENTAGE OF COLOR IMAGE AFTER EXPOSURE TO XENON TESTER FOR 20 HOURS

| Color image | Addition compounds, percent | | | | |
|---|---|---|---|---|---|
| | None | Compound 1 | Compound 2 | Compound 3 | Compound 4 |
| Cyan | 40 | 10 | 15 | 10 | 10 |
| Magenta | 20 | 0 | 2 | 3 | 1 |
| Yellow | 40 | 15 | 20 | 15 | 15 |

As is seen from the experimental results, the fading of the color image was prevented or reduced by using the ultraviolet absorber of the present invention. Further, as could be anticipated naturally, when the high molecular ultraviolet absorber of this invention was incorpated in an intermediate layer between a first silver halide emulsion layer and a second silver halide emulsion layer, or in an intermediate layer between a second silver halide emulsion layer and a third silver halide emulsion layer, instead of being incorporated in the protective layer, the fading of the color image in the layer below the intermediate layer containing the ultraviolet absorber was prevented or reduced. Moreover, when a film base was used instead of the baryta paper, almost the same results were obtained.

EXAMPLE 3

To a baryta paper were applied the blue-sensitive silver halide emulsion containing the yellow coupler as in Example 2, and the green-sensitive silver halide emulsion containing the magenta coupler as in Example 2, as bottom and middle layers respectively, and as a top layer there was applied the red-sensitive silver halide emulsion containing a cyan coupler, as in Example 2, and a high molecular ultraviolet absorber of this invention having the formula shown in Example 1 in an amount of 50 g. of 4% solution per 1 kg. of emulsion to provide a multi-layered light-sensitive color element.

After exposure, the thus prepared light-sensitive element was subjected to developing, stop-fixing, water-washing, bleach-fining, water-washing, hardening, water-washing and drying. Thereafter, thus processed light-sensitive element was exposed for 20 hours to a xenon tester, as in Example 2, and then the reduction in color image density was measured. The results of the test are as follows:

FADING PERCENTAGE OF COLOR IMAGE AFTER EXPOSURE TO XENON TESTER FOR 20 HOURS

| Color image | Addition compound, percent | | | | |
|---|---|---|---|---|---|
| | None | Compound 1 | Compound 2 | Compound 3 | Compound 4 |
| Cyan | 40 | 20 | 25 | 25 | 20 |
| Magenta | 20 | 0 | 5 | 5 | 0 |
| Yellow | 40 | 15 | 20 | 20 | 15 |

As is seen from the experimental results, a very large ultraviolet preventing effect was obtained by incorporating directly in a silver halide emulsion layer the high molecular ultraviolet absorber of the present invention without forming a separate ultraviolet filter layer. When a film base was used as the support instead of the baryta paper, almost the same results were obtained.

What is claimed is:

1. A color photographic paper which comprises a baryta paper bearing thereon at least one light-sensitive silver halide emulsion layer and a gelatin layer on the uppermost light-sensitive silver halide emulsion layer, said gelatin layer having incorporated therein, as an agent to reduce the undesired effects of ultraviolet radiation, a compound selected from the group consisting of compounds having the following recurring structure:

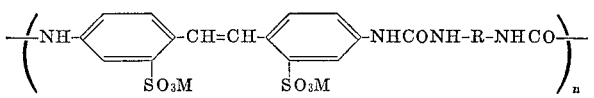

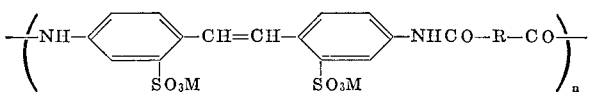

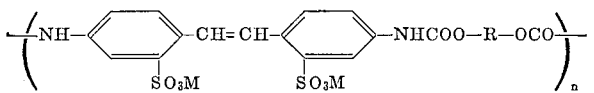

and

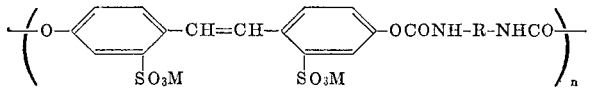

wherein:

M is an alkali;

R is an aromatic or aliphatic bivalent radical selected from the group consisting of;

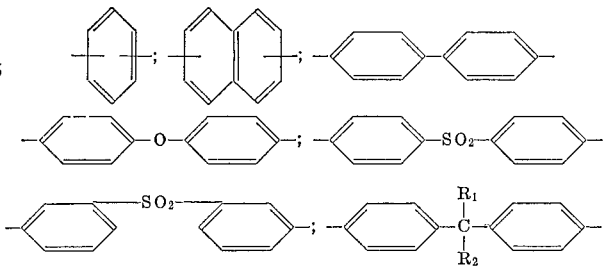

in which $R_1$ and $R_2$ are selected from the group consisting of hydrogen atoms, alkyl radicals containing up to 5 carbon atoms, $(CH_2)_p$, in which $p$ is an integer from 1 to 10, and $(CH_2CH_2-O)_qCH_2CH_2-$ in which $q$ is an integer from 1 to 3;

$n$ is the polymerization degree, and wherein said polymerization degree is such that the intrinsic viscosity of said polymer in formamide at 30° C. is from 0.05 to 2.0.

2. The color photographic paper as claimed in claim 1, wherein said compound is a polyurea containing the recurring structure:

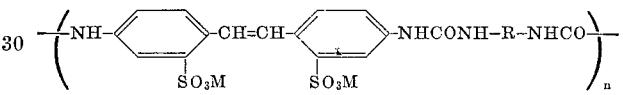

wherein M is an alkali metal; R is a bivalent organic radical; and $n$ is the degree of polymerization.

3. The color photographic paper as claimed in claim 1 wherein said compound is a polyamide containing the recurring structure:

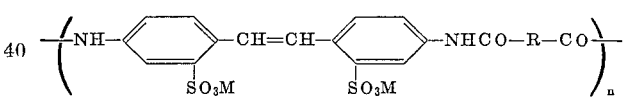

wherein M is an alkali metal; R is a member selected from the group consisting of aromatic and aliphatic bivalent residual groups; and $n$ is the degree of polymerization.

4. The color photographic paper as claimed in claim 1 wherein said compound is a polyurethane containing the recurring structure:

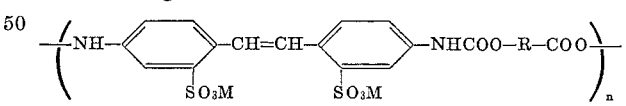

wherein M is an alkali metal; R is a member selected from the group consisting of aromatic and aliphatic bivalent residual groups; and $n$ is the degree of polymerization.

5. The color photographic paper as claimed in claim 1 wherein said compound is a polyurethane containing the recurring structure:

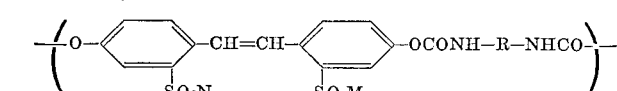

wherein M is an alkali metal; R is a member selected from the group consisting of aromatic and aliphatic bivalent residual groups, and $n$ is the degree of polymerization.

6. The color photographic paper as claimed in claim 1 wherein the proportion of said compound is from 10 to 500 g. per 1 kg. of the gelatin in said layer.

7. A color photographic paper which comprises a baryta paper bearing thereon at least one light-sensitive silver halide emulsion layer and a gelatin layer on the uppermost light-sensitive silver halide emulsion layer, said gelatin layer having incorporated therein, as an agent to reduce the undesired effects of ultraviolet radiation, a compound selected from the group consisting of compounds having the following recurring structure:

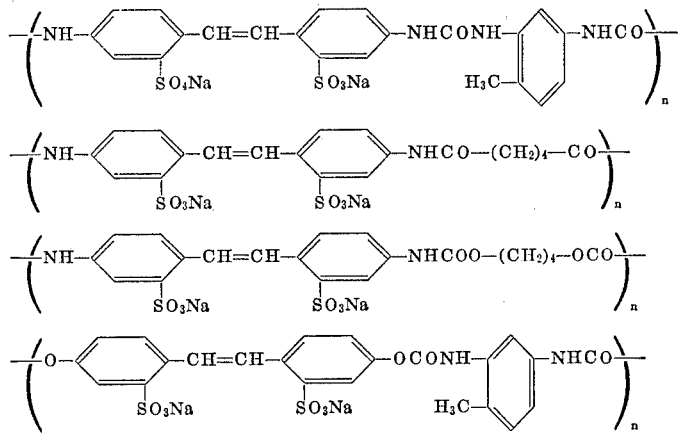

wherein $n$ is the polymerization degree and wherein said polymerization degree is such that the intrinsic viscosity of said polymer in formamide at 30° C. is from 0.05 to 2.0, and wherein from 10 to 500 g. of said compound is incorporated in said gelatin layer per 1 kg. of gelatin.

References Cited

UNITED STATES PATENTS

| | | | |
|---|---|---|---|
| 3,269,840 | 8/1966 | Pattyn et al. | 96—82 |
| 2,882,157 | 4/1959 | Thompson et al. | 96—87 |

FOREIGN PATENTS

| | | | |
|---|---|---|---|
| 867,539 | 5/1961 | Great Britain | 96—87 |

RONALD H. SMITH, Primary Examiner

U.S. Cl. X.R.

96—82, 85, 74